United States Patent [19]
Mimura et al.

[11] Patent Number: 5,280,359
[45] Date of Patent: Jan. 18, 1994

[54] IMAGE PICK-UP DEVICE WITH AUTO LENS CONTROL FOR FREELY SELECTING PHOTOMETRIC AREA

[75] Inventors: Hidetoshi Mimura, Yokohama; Haruo Kogane, Kawasaki; Makoto Sube, Yokohama, all of Japan

[73] Assignee: Matsushita Electric Industrial Co., Ltd., Osaka, Japan

[21] Appl. No.: 856,648

[22] Filed: Mar. 24, 1992

[30] Foreign Application Priority Data

Apr. 5, 1991 [JP] Japan .................. 3-072861

[51] Int. Cl.⁵ .................. H04N 5/238; H04N 5/30
[52] U.S. Cl. .................. 358/228; 358/224
[58] Field of Search .......... 358/228, 227, 224, 209; 354/410, 430; H04N 5/238

[56] References Cited

U.S. PATENT DOCUMENTS

| | | | |
|---|---|---|---|
| 4,412,730 | 11/1983 | Saegusa et al. | 354/410 |
| 4,829,382 | 5/1989 | Hess et al. | 358/228 |
| 4,887,121 | 12/1989 | Pritchard | 358/228 |
| 5,049,997 | 9/1991 | Arai | 358/228 |
| 5,051,833 | 9/1991 | Tsuji | 358/228 |
| 5,128,711 | 7/1992 | Terashita et al. | 354/430 |

FOREIGN PATENT DOCUMENTS

| | | | |
|---|---|---|---|
| 0152496 | 8/1985 | European Pat. Off. | |
| 62-281683 | 12/1987 | Japan . | |
| 225178 | 1/1990 | Japan . | |
| 2076481 | 3/1990 | Japan | H04N 5/238 |

OTHER PUBLICATIONS

Patent Abstracts of Japan, vol. 9, No. 110 (E-314) May 15, 1985 & JP-A-60 000 170 (Canon K.K.ü) Jan. 5, 1985—Abstract.
Patent Abstracts of Japan, vol. 15, No. 140 (P-1188) Apr. 9, 1991 & JP-A-30 18 836 (Canon Inc.) Jan. 28, 1991—Abstract.
Patent Abstracts of Japan, vol. 15, No. 175 (E-1063) May 2, 1991 & JP-A-30 38 977 (Olympus Optical Co. Ltd). Feb. 20, 1991—ABS.

Primary Examiner—Michael T. Razavi
Assistant Examiner—Wendy R. Greening
Attorney, Agent, or Firm—Stevens, Davis, Miller & Mosher

[57] ABSTRACT

A video camera specifies as a photometric area any block of a field of image to be picked up and picks up a subject to be seen by optimizing the amount of light regardless of the position where a television camera is located. The video camera comprises a solid-state image pick-up element (CCD), a display device and devices for controlling the diaphragm of a lens. In operation, the image picked up by the solid-state image pick-up element is divided into plural blocks to be displayed. Any block of these plural blocks can be specified as a photometric area. The amount of light for the photometric area is calculated and the diaphragm of the lens is controlled so that the subject can be seen by optimizing amount of light.

3 Claims, 2 Drawing Sheets

FIG. 2

| 21-1 | 21-2 | 21-3 | 21-4 | 21-5 |
|------|------|------|------|------|
| 21-6 | 21-7 | 21-8 | 21-9 | 21-10 |
| 21-11 | 21-12 | 21-13 | 21-14 | 21-15 |
| 21-16 | 21-17 | 21-18 | 21-19 | 21-20 |
| 21-21 | 21-22 | 21-23 | 21-24 | 21-25 |

IMAGE PICK-UP DEVICE WITH AUTO LENS CONTROL FOR FREELY SELECTING PHOTOMETRIC AREA

BACKGROUND OF THE INVENTION

1. Field of the Invention

The present invention relates to an image pick-up device or video camera for use in a television camera, and more particularly to a diaphragm control optimizing the light amount for a subject.

2. Description of the Related Art

A previously known video camera for the television camera serves to set a photometric or light lo measuring area at the center of the field of image to be picked up, and has a function of controlling the diaphragm of the lens in accordance with only the light amount within the photometric area so as to control the light amount automatically (this function is generally called ALC (Auto Lens Control)).

In such a video camera, the lens diaphragm is not closed even if light is incident on the outside of the light measuring area. Under the condition of backlight, therefore, this camera can pick up the image of a subject against an optimum amount of light as long as the subject is located within the photometric area, as disclosed by Sudoh et al. in JP-A-62-281683.

However, in the conventional video camera, the photometric area is fixed only at the center area. Thus, if the television camera is set so that the subject is located outside the photometric area, an ALC circuit does not operate properly. As a result, the subject cannot be picked up clearly. Namely, under the condition of backlight, the subject will darken.

An improved video camera is disclosed by Nita at al. in JP-A-2-25178 in which the photometric area in the image field can be moved both in the vertical and horizontal directions and the iris is controlled based on the luminance of the subject irrespective of the light source in the field. But the disclosed video camera is not operated in easy way and it cannot obtain a good picture with a natural tone considering background lights.

SUMMARY OF THE INVENTION

An object of the present invention is to provide a video camera which can optionally set a photometric area to optimize an amount of light, thus preventing a subject from being so dark that it cannot be seen under any condition that a television camera is located, and also can easily set the photometric area.

In order to achieve the above object, in accordance with the present invention, there is provided a video camera comprising image pick-up means having an ALC function, means for dividing a field of image into plural blocks, display means for mixing these plural blocks of the field with the image picked up by the image pick-up means, and control means for performing the ALC function for the plural field blocks other than selected blocks for masking parts of the field.

In accordance with the present invention, by optionally setting photometric areas excluding excessively luminal areas, the subject can be seen with an optimized amount of light under any condition where the television camera is located. Further, since the selected block can be displayed, the position where the present photometric areas are located can be recognized apparently.

The above and other objects and features of the present invention will be more apparent from the following description taken in conjunction with the accompanying drawings.

BRIEF DESCRIPTION OF THE DRAWINGS

FIG. 2 is an exemplary display of a photometric area when the field of image picked up by the video camera is divided into 25 blocks.

DESCRIPTION OF THE PREFERRED EMBODIMENT

Figure 1:
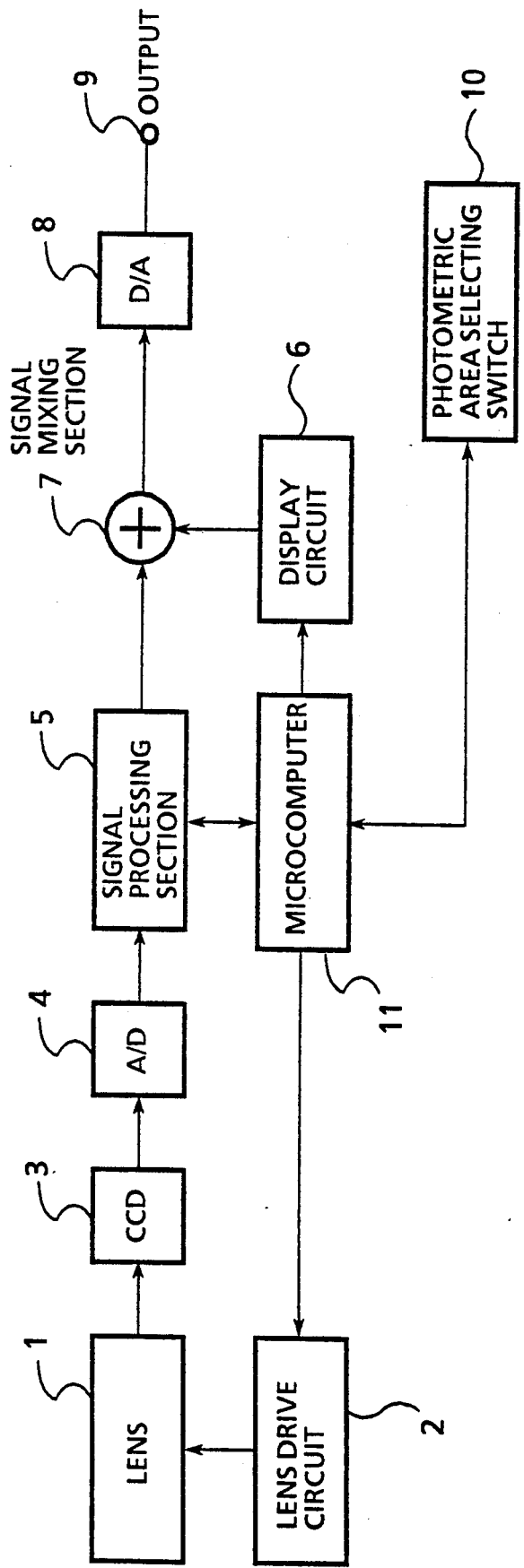
FIG. 1 is a schematic block diagram of the video camera according to an embodiment of the present invention.

Now referring to the drawing, an embodiment of the present invention will be explained below.

In FIG. 1, 1 denotes an ALC (auto-lens-control) lens; 2 denotes a lens drive circuit for controlling the ALC lens; 3 denotes a solid-state image pick-up device or CCD (charge coupled device) for converting an incident light from the ALC lens into an electric signal; 4 denotes an A/D converter section for converting the electric signal supplied from the CCD 3 into a digital signal; and 5 denotes a signal processing section for processing the digital signal from the A/D converter section 4. The signal processing section 5 serves to divide a field of image 21 into twenty five blocks 21-1 to 21-25 so that the signal processing can be performed for each of these blocks. Numeral 6 denotes a display circuit; 7 denotes a signal mixing section for mixing the signal from the signal processing section 5 with the signal from the display circuit 6; 8 denotes a D/A converter section for converting the signal from the signal mixing section 7 into an analog signal to be sent to an output terminal 9; 10 denotes a photometric area selecting switch for selecting any photometric area from the blocks 21-1 to 21-25 of the field of image 21 picked up; and 11 denotes a microcomputer for controlling the signal processing 5, the lens drive circuit 2, the display circuit 6 and the photometric area selecting switch 10.

The arrangement including the above components will be further described in detail together with its operation.

The light incident from the ALC lens 1 is converted into an electrical signal by the CCD 3. The electrical signal is converted into a digital signal by the A/D converter section 4 and the digital signal is supplied to the signal processing section 5. Now, as shown in FIG. 2, if high luminal spot light is incident on the blocks of 21-2, 21-3 and 21-7 of the field of image 21 and a mirror reflecting the light on the blocks of 21-10 and 21-15, and the subject image to be picked up incident on the blocks including the blocks 21-13, 21-14, 21-18 and 21-19 is so dark that it cannot be seen, operate the photometric area selecting switch 10. Then, the microcomputer 11 controls the display circuit 6 so that the signal mixing section 7 mixes a 25-dividing line signal indicative of dividing lines into the subject image signal which is now being displayed. The D/A converter section 8 converts the signal thus formed into the corresponding analog signal to be outputted to the output terminal 9. Thus, the image supplied from the CCD 4 and the dividing line signal from the display circuit 6 are outputted in an interposing manner. As a result, which blocks of the photometric areas where the subject to be picked up is located can be known correctly. In this case, the photometric area selecting switch 10 is operated so as to mask the blocks 21-2, 21-3, 21-7, 12-10 and 21-15 of the field of image 21. Correspondingly, the microcomputer 11 excludes the signal for the blocks 21-2, 21-3, 21-7, 12-10 and 21-15 and controls the lens drive circuit 2 on the basis of the signal for the remaining blocks. The microcomputer 11 controls the display circuit 6 so that the blocks 21-2, 21-3, 21-7, 12-10 and 21-15 are "painted over". These blocks are painted over also at the output terminal 9. The blocks painted over and the dividing lines disappear after a predetermined time so that only the image from the CCD will be outputted at the output terminal 9.

Once the photometric area is specified, the lens drive circuit 2 is controlled on the basis of the signal for the blocks other than the blocks 21-2, 21-3, 21-7, 21-10 and 21-15. Thus, the diaphragm of the ALC lens 1 will be operated to be more open than before. As a result, the amount of light for the blocks 21-13, 21-14, 21-18 and 21-19 is increased so that the image of the subject corresponding to these blocks can be seen brightly at the terminal 9.

In this way, in accordance with the embodiment described above, by operating the photometric area selecting switch 10, any block of 25-divided blocks 21-1 to 21-25 on the field of image 21 can be easily specified as a masking area. Hence, the subject which is too dark to see because of backlight becomes to be seen by adjusting an optimum amount of light of the remaining photometric areas.

As understood from the description hitherto made, in accordance with the present invention, since any block of the plural blocks into which the field of image is divided can be specified as a photometric area, the subject to be picked up can be seen by optimizing the amount of light of the subject regardless of the position where a television camera is located. Further, since the specified block(s) can be displayed, the position of a present photometric area can be apparently known, thereby permitting the photometric area to be easily set.

We claim:

1. An image pick-up device having an auto lens control function for automatically controlling a level of incident light in accordance with an intensity of light from a photometric area of an object, the image pick-up device comprising:

image pick-up means for providing a video image of the object;

section means for sectioning the video image into a plurality of sectional images;

display means for displaying the plurality of sectional images;

selection means for selecting one or more designated sectional images from among the plurality of sectional images; and control means for performing the auto lens control function in accordance with a light intensity of the plurality of sectional images other than the one or more designated sectional images.

2. An image pick-up device according to claim 1, further comprising a diaphragm located between the object and the image pick-up means, wherein the control means performs the auto lens control function by controlling the diaphragm.

3. An image pick-up device according to claim 1, wherein the selection means is capable of selecting any configuration of one or more sectional images as the one or more designated sectional images.

* * * * *